United States Patent [19]
Yamazaki

[11] Patent Number: 5,938,231
[45] Date of Patent: Aug. 17, 1999

[54] AIR BAG DEVICE FOR A TWO-WHEELED MOTOR VEHICLE

[75] Inventor: Takeshi Yamazaki, Saitama, Japan

[73] Assignee: Honda Giken Kogyo Kabushiki Kaisha, Tokyo, Japan

[21] Appl. No.: 08/878,558

[22] Filed: Jun. 19, 1997

[30] Foreign Application Priority Data

Jun. 19, 1996 [JP] Japan .................................. 8-158615

[51] Int. Cl.$^6$ .................................................. B60R 21/22
[52] U.S. Cl. ................................... 280/730.1; 280/728.1
[58] Field of Search .............................. 280/728.1, 730.1

[56] References Cited

U.S. PATENT DOCUMENTS

| 3,930,667 | 1/1976 | Osuchowski et al. | 280/730.1 |
| 4,984,821 | 1/1991 | Kim et al. | 280/728.1 |

FOREIGN PATENT DOCUMENTS

52-81842  7/1977  Japan .

*Primary Examiner*—Kenneth R. Rice
*Attorney, Agent, or Firm*—Birch, Stewart, Kolasch & Birch, LLP

[57] ABSTRACT

An air bag device for a two-wheeled motor vehicle is equipped with an air bag which restrains a rider upon occurrence of an accident without the rider feeling resistive or without trouble with regard to putting on and taking off the air bag device. An air bag provided on a vehicle body includes a front bag portion which is disposed to be opposed to the front side of a rider in an expanded state of the air bag and right and left side bags which are disposed to be opposed to both right and left sides of the rider in an expanded state of the air bag. The air bag when expanded twines around the rider.

10 Claims, 9 Drawing Sheets

AIR BAG DEVICE FOR A TWO-WHEELED MOTOR VEHICLE

BACKGROUND OF THE INVENTION

1. Field of the Invention

The present invention relates to an air bag device for a two-wheeled motor vehicle for cushioning a rider against a crash or other abnormal operation of the vehicle.

2. Description of Background Art

According to a conventional, known air bag device for a two-wheeled motor vehicle (see Japanese Patent Laid Open No.81842/77), a large number of small air bags are attached throughout the entire outer surface of a one piece type article of clothing. A rider of the vehicle wears the clothing, and upon detection of a crash, compressed air is introduced into each of the small bags to expand the bags, allowing the rider to be cushioned by the expanded small bags.

However, the above conventional air bag device involves the following problems because the air bags are attached to the body of the rider:

1. When the rider sits on the seat of the two-wheeled motor vehicle, the rider is required to wear the clothing equipped with the air bags and so feels resistive or uneasy.
2. In order not to obstruct the driver's motion which is necessary for driving, a limit is inevitably encountered with respect to the size and capacity of each air bag. It is necessary to consider a folded shape and size of the air bag device during a normal condition.
3. Every time the rider gets on and off the vehicle, the rider is required to put on or take off the air bag device. This is troublesome.
4. It is necessary that the air bag device, once taken off, should be stowed a container or should be carried. This is also troublesome.

SUMMARY AND OBJECTS OF THE INVENTION

The present invention has been accomplished in view of the above-mentioned circumstances and it is an object of the invention to provide a novel air bag device for a two-wheeled motor vehicle wherein the air bag device is provided on the vehicle body side to solve the above-mentioned problems and wherein the air bag device ensures a cushioning performance for a rider.

According to the present invention, in order to achieve the above-mentioned object, there is provided an air bag device for a two-wheeled motor vehicle capable of restraining and cushioning a rider by expansion of an air bag provided on a body of the vehicle. The air bag includes a front bag portion which comes to be opposed to the front side of the rider upon expansion of the air bag and right and left side bag portions which extend integrally backward from both right and left sides of the front bag portion and which come to be opposed to both right and left sides of the rider upon expansion of the air bag. The air bag twines around the body of the rider upon expansion thereof.

According to the present invention, there is provided, an air bag device for a two-wheeled motor vehicle wherein free ends of the right and left side bag portions are rolled inside toward each other to restrain and cushion both sides of the back of the rider.

According to the present invention, there is provided an air bag device for a two-wheeled motor vehicle wherein the surface of the air bag which comes to be opposed to the rider is provided with an adhesive material for improving the adhesion to the rider's clothes.

According to the present invention, there is provided an air bag device for a two-wheeled motor vehicle wherein an air bag module provided with the air bag is movable forward with respect to the vehicle body upon occurrence of a crash accident.

According to the present invention, in order to achieve the foregoing object, there is provided, in combination with the air bag device for a two-wheeled motor vehicle wherein an air bag module provided with the air bag can be disengaged from the vehicle body after expansion of the air bag.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described hereinafter by way of an embodiment thereof illustrated in the accompanying drawings.

Figure 1:
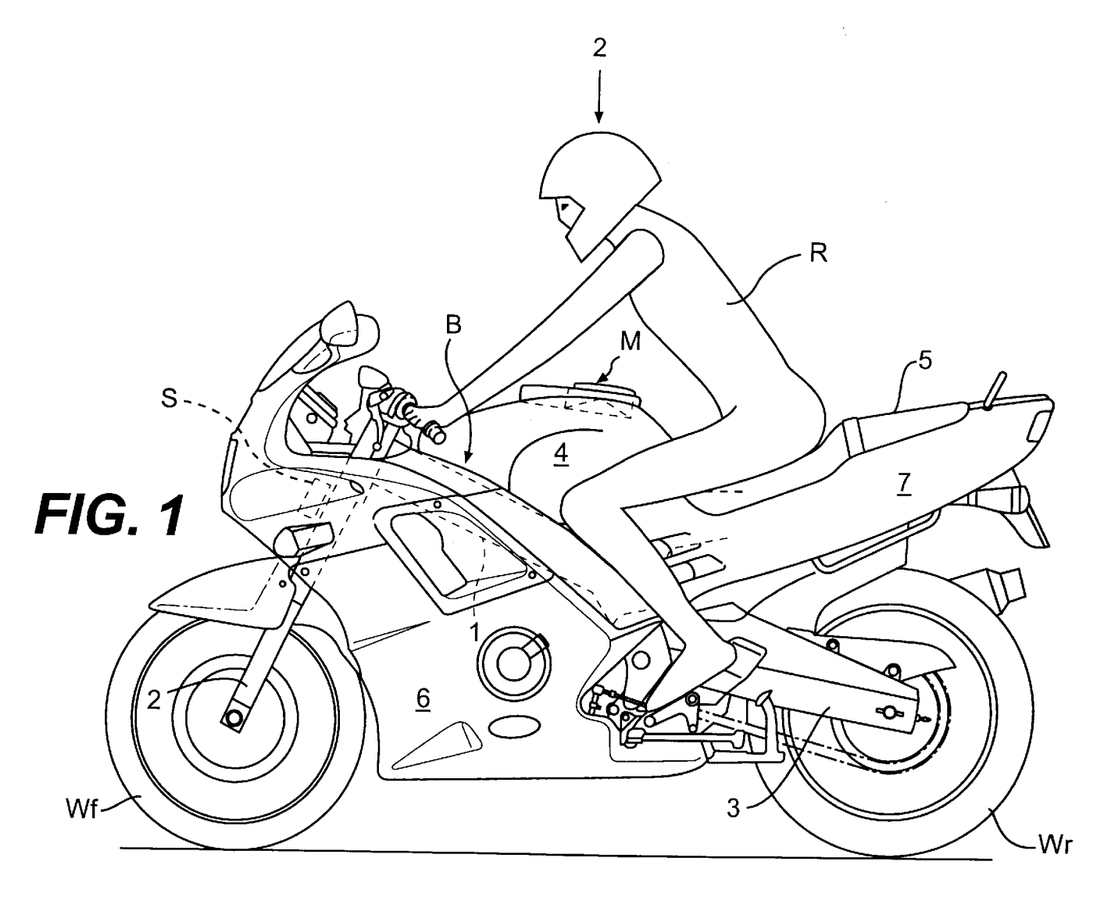
FIG. 1 is a side view of a two-wheeled motor vehicle equipped with an air bag device embodying the present invention.
Figure 2:
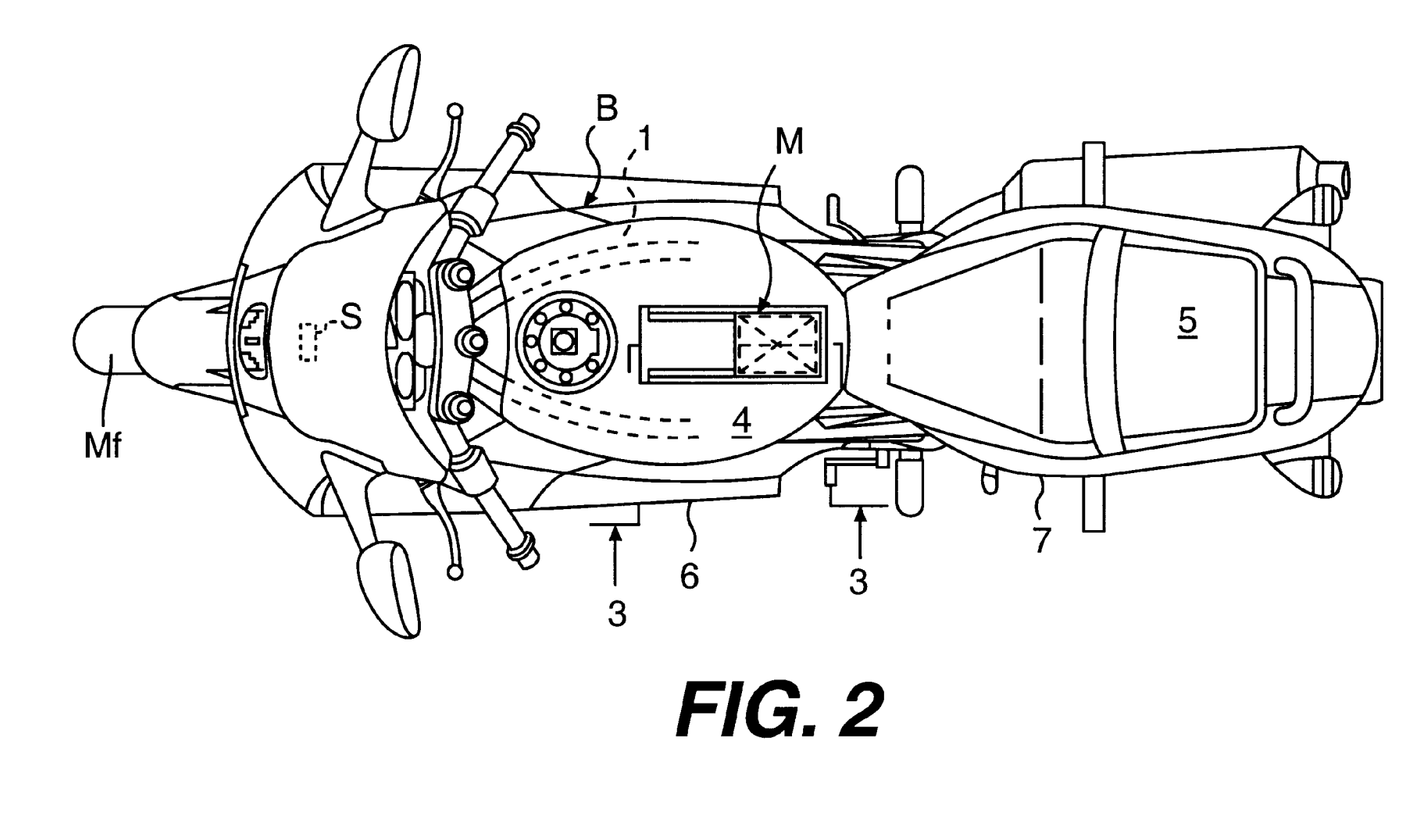
FIG. 2 is a plan view of the two-wheeled motor vehicle as seen in the direction of arrow 2 in FIG. 1.

An embodiment of the invention will now be described with reference to FIGS. 1 to 9. In FIGS. 1 and 2, front forks 2 are supported steerably by a body frame 1 which constitutes a main structure of a body B of a two-wheeled motor vehicle. A front wheel Wf is supported rotatably by the front forks 2. A rear wheel Wr is supported by swing arms 3 which are suspended at the rear portion of the body frame 1. A fuel tank 4 is mounted on the front half portion of the body frame 1, and a seat 5 is supported on the rear seat rails. A large part of the body frame 1 is covered with a front cowl 6 and a rear cowl 7. The body frame 1, fuel tank 4, front cowl 6 and rear cowl 7 constitute the body B of the two-wheeled motor vehicle.

A longitudinally elongated, rectangular recess 8 having an open front side is formed on the upper surface of the fuel tank 4 in a transversely central position, and an air bag module M for cushioning a rider against a crash of the vehicle is disposed in the recess 8.

Figure 3:
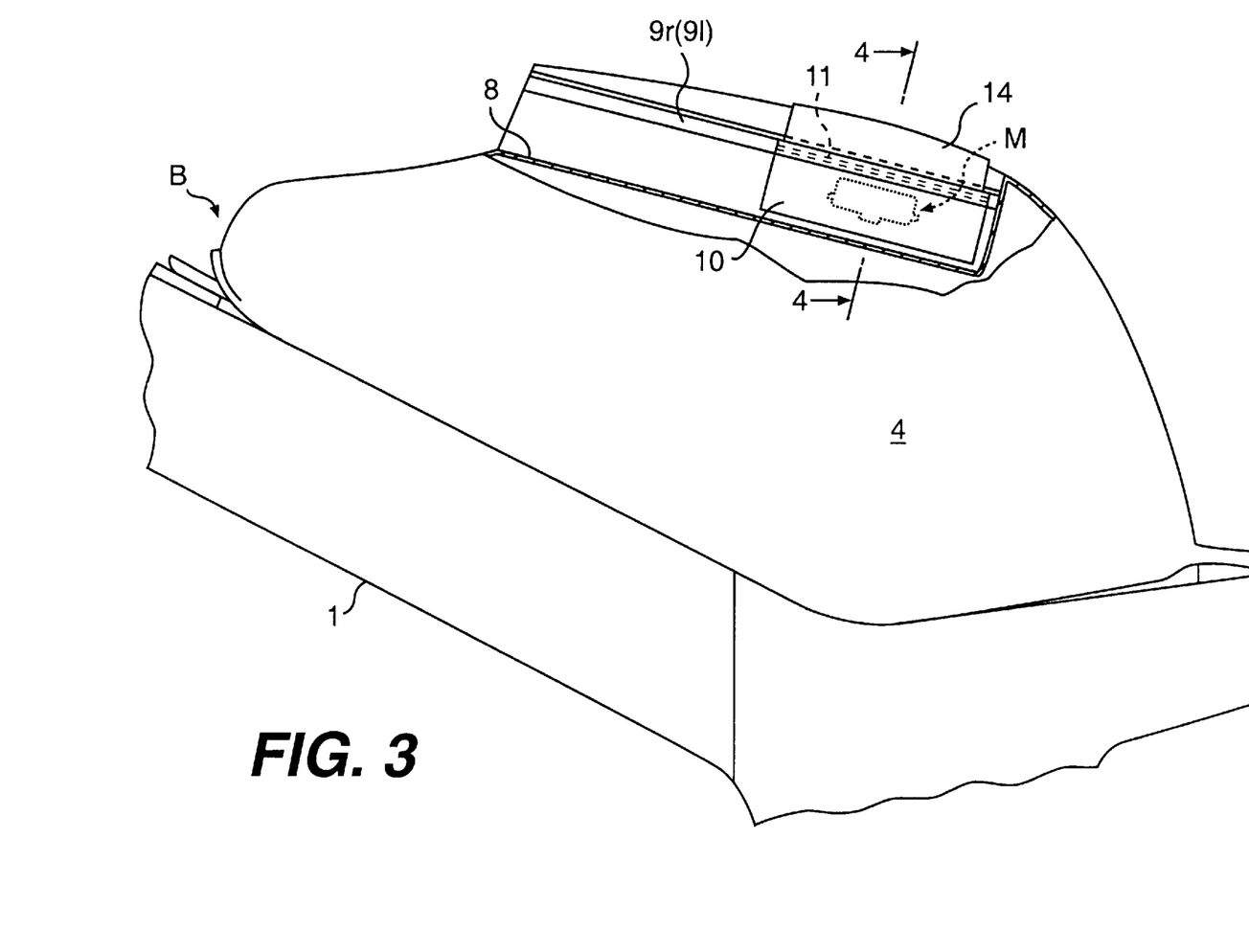
FIG. 3 is a partially cut-away, partially enlarged side view taken along line III—III in FIG. 2.
Figure 4:
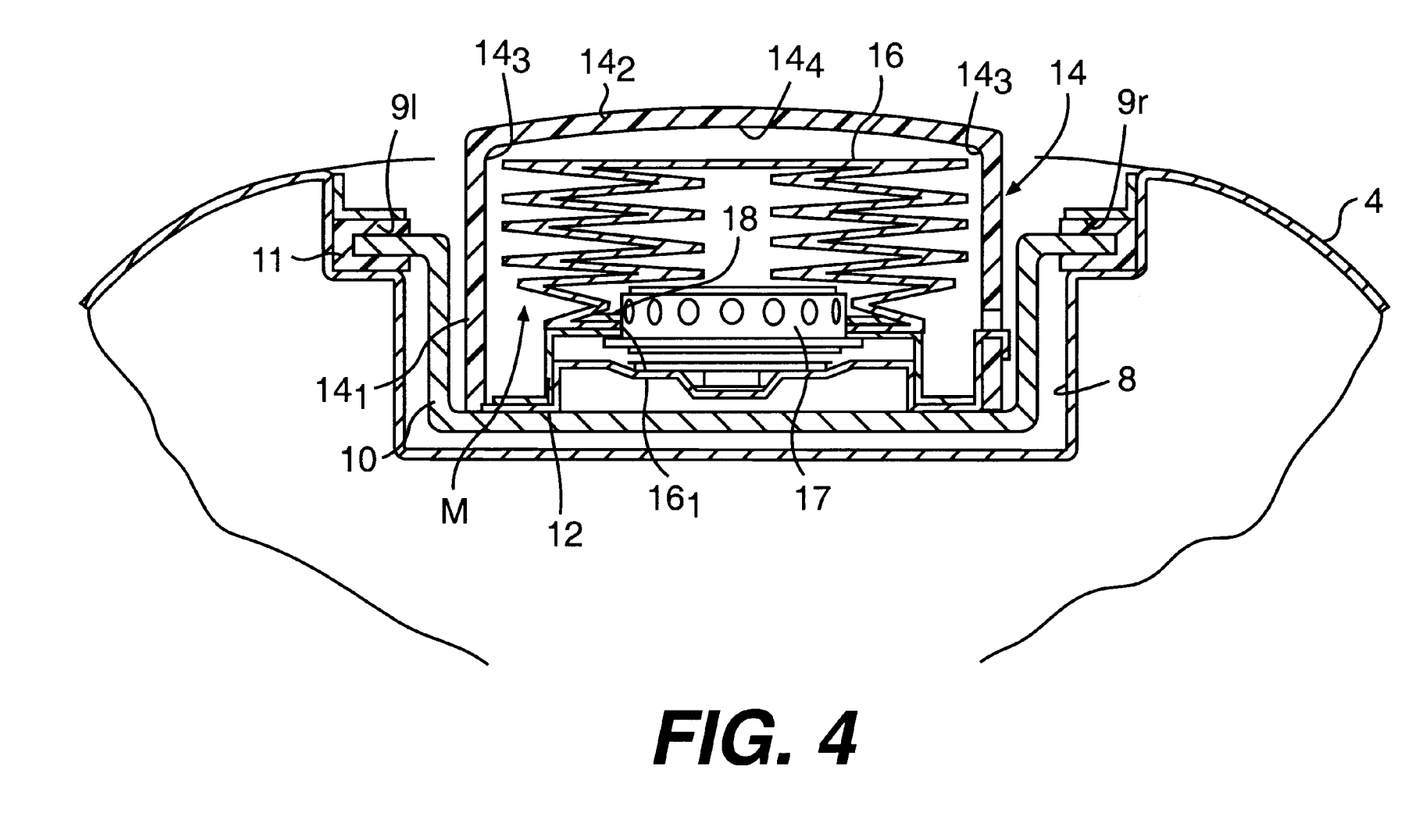
FIG. 4 is an enlarged vertical sectional view of an air bag module taken along line IV—IV in FIG. 3.
Figure 5:
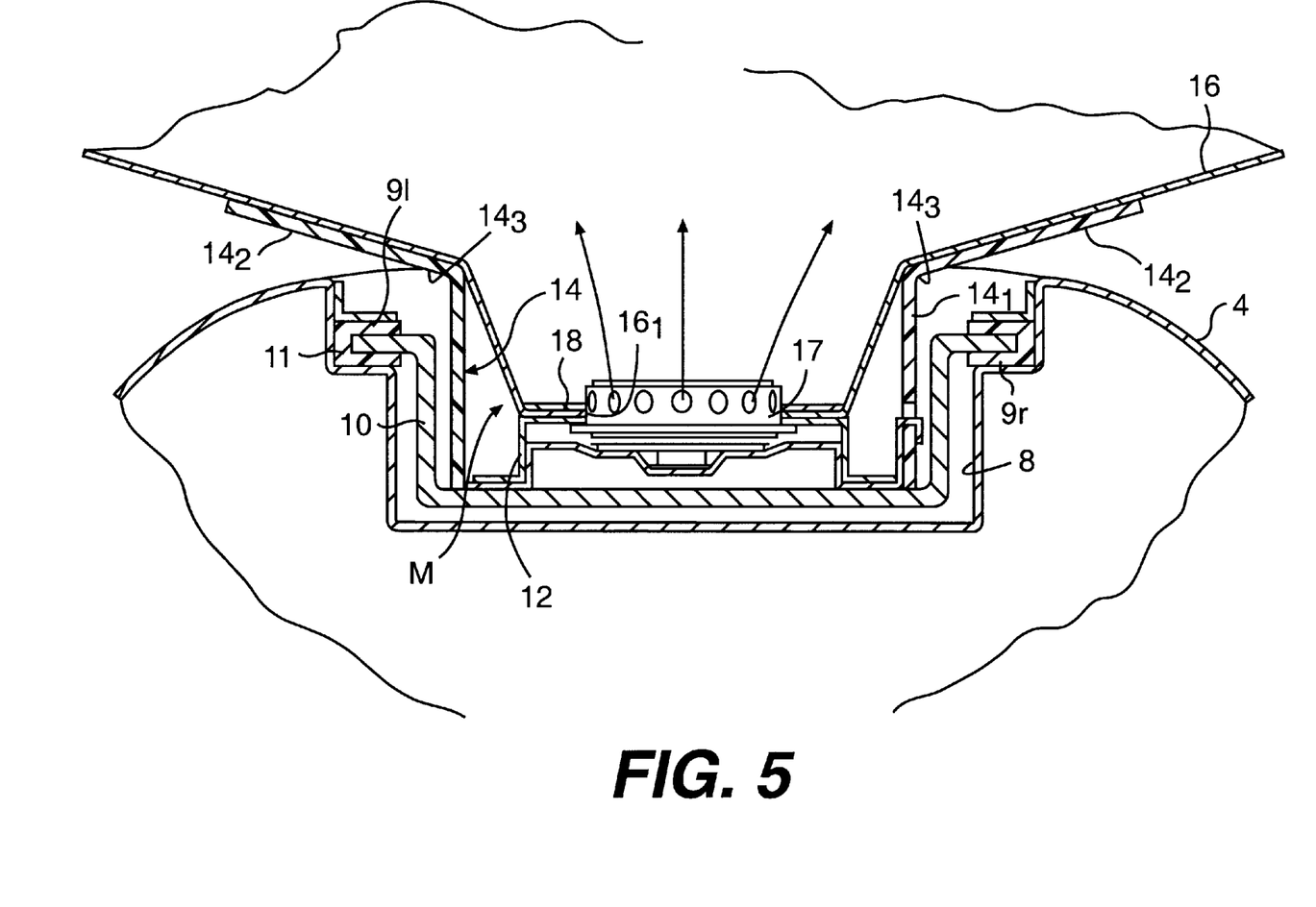
FIG. 5 is a vertical sectional view of the air bag module in an expanded state of an air bag.

The following description is now provided with regard to construction and mounting structure of the air bag module M with reference to FIGS. 3 to 5.

On the left and right inner side faces of the recess 8 are formed left and right guide rails $9l$, $9r$ which extend in the longitudinal direction substantially throughout the overall length of the inner side faces. The front ends of the guide rails $9l$ and $9r$ are open to the front. Both left and right side edges of a slide frame 10, which is channel-shaped in vertical section, is fitted in the left and right guide rails $9l$, $9r$, respectively, in a longitudinally slidable manner through a resistance imparting material 11 which is a synthetic resin material for example. A mounting frame 12 is fixed onto the bottom wall of the slide frame 10, and a lower opening portion of an air bag housing 14 is secured to the mounting frame 12. The air bag housing 14, which is formed in the shape of a cap using a light-weight material such as a synthetic resin material, includes a receptacle portion $14_1$ capable of receiving therein the air bag module M and a cover portion $14_2$ for closing the open upper surface of the receptacle portion $14_1$. At the right and left boundary corners between the receptacle portion $14_1$ and the cover portion $14_2$ are formed hinge portions $14_3$. Further, a breaking line $14_4$ with an I-shaped cut extending from the front to the rear edge at the transversely central position is formed in the cover $14_2$. When an impact force exceeding a predetermined value is exerted on the two-wheeled motor vehicle, the breaking line $14_4$ is ruptured and the cover portion $14_2$ is opened upward with the hinge portions $14_3$ as fulcrums, as shown in FIG. 5.

Within the air bag housing 14, the air bag module M is mounted on the mounting frame 12. The air bag module M is provided with an air bag 16 and an inflator 17 for generating a gas to expand the air bag 16. The air bag 16 is formed in the shape of a bag having a lower opening 16 and is accommodated in a folded state within the air bag housing 14. A mouthpiece 18 is fixed to the lower opening 16, and the outer peripheral portion of the inflator 17 is fixed to the mouthpiece 18 in a hermetically sealed state. The inflator 17 is integrally supported on the mounting frame 12.

Figure 6:
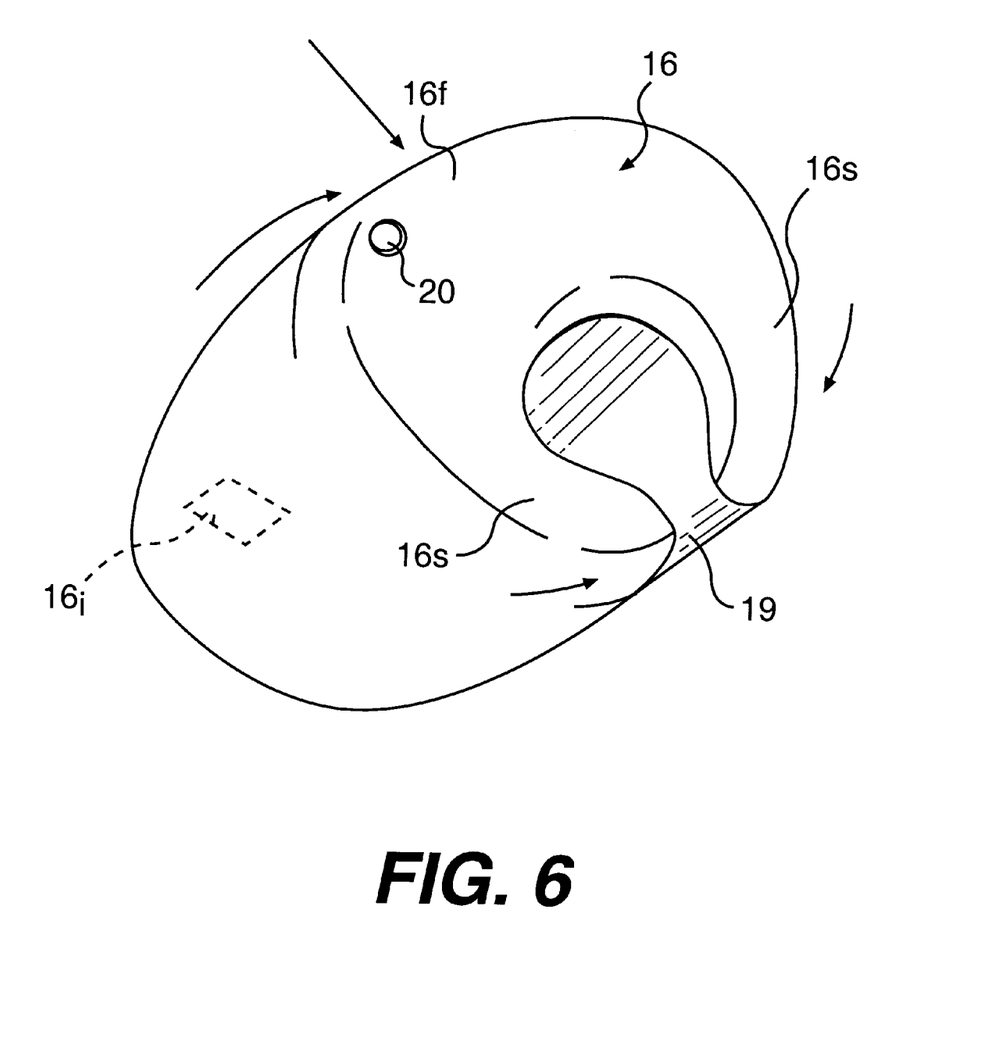
FIG. 6 is a perspective view of the air bag in an expanded state.
Figure 7:
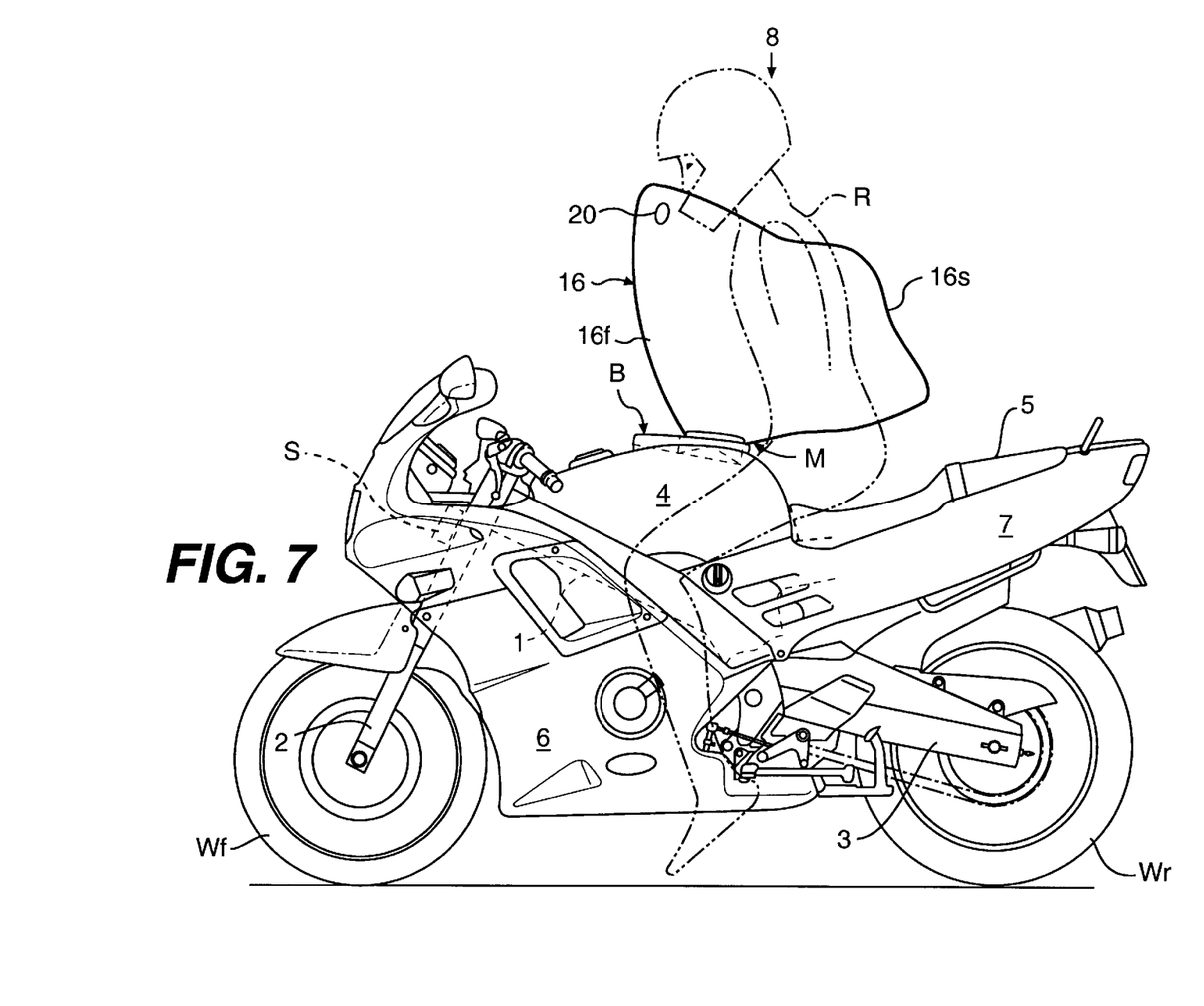
FIG. 7 is a side view of the two-wheeled motor vehicle in an expanded state of the air bag.
Figure 8:
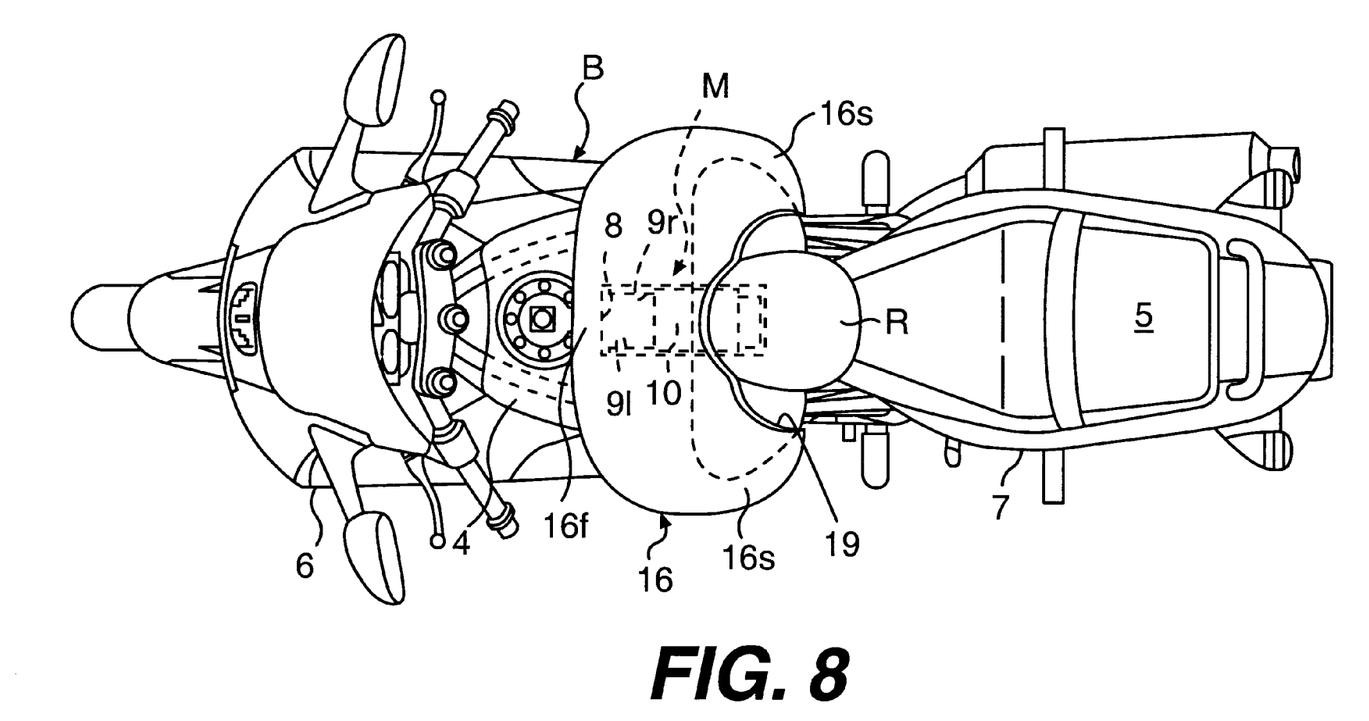
FIG. 8 is a plan view of the two-wheeled motor vehicle as seen in the direction of arrow 8 in FIG. 7.

As shown clearly in FIG. 6, in order that the air bag 16 when expanded may twine around the body of a rider R in a surrounding relation to the rider from the front to both right and left sides and even up to the back of the rider, the air bag 16 when expanded assumes a C shape in cross section. This shape is formed by a front bag portion $16f$ and right and left side bag portions $16s$, $16s$ extending from both right and left sides of the front bag portion $16f$ towards the rear while curving inwardly. The height of the expanded air bag is set at such a value to cover the face and the upper half of the rider R on the seat 5. The air bag 16 is formed by applying a coating material such as, for example, neoprene for preventing the leakage of gas to a polyamide-based cloth having a high tensile strength. In order to facilitate adhesion of the air bag to the rider's clothes, an adhesive means 19 such as, for example, a face fastener or a pressure-sensitive adhesive is laminated to the surface of the air bag 16 which surface is opposed to the rider.

In appropriate positions of the air bag 16 are formed vent holes 20 each provided with a relief valve so that when the internal pressure of the air bag 16 exceeds a predetermined value in an expanded state of the air bag, the inside high-pressure gas is discharged to the exterior through the vent holes 20.

As shown in FIG. 1, a shock sensor S, for example, a G sensor, is provided at a front position of the body frame 1, and a detected signal from the sensor S actuates the inflator 17 to supply a high-pressure gas to the air bag 16.

The operation of this embodiment will now be described with reference to mainly FIG. 1 and FIGS. 7 to 9. When the two-wheeled motor vehicle crashes against an obstacle, for example another vehicle, the shock sensor S detects the crash and outputs a detected signal to actuates the inflator 17, which in turn generates a high-pressure gas. The gas is fed to the folded air bag 16 through the lower opening $16_1$ of the bag. As a result, as shown in FIGS. 6 to 9, the air bag 16 expands and twines around the body of the rider R in such a manner that the front bag portion $16f$ is opposed to the front side of the upper half of the rider and the right and left side bag portions $16s$, $16s$ are opposed to the right and left sides and the back of the rider's upper half. Further, the adhesive means 19, for example, a face fastener, which is provided on each of the surfaces opposed to the rider R adheres to the rider's clothes, whereby the air bag 16 is fitted on the body of the rider R.

The internal pressure of the air bag 16 is adjusted to a predetermined value most suitable for cushioning the rider R by means of the vent holes 20 each equipped with a relief valve.

On the other hand, the slide frame 10 which carries thereon the air bag module M including the air bag 16 undergoes a force of inertia upon a crash of the vehicle and slides forward within the recess 8 while being guided by the left and right guide rails $9l$,$9r$. During this forward sliding motion, the slide frame 10 absorbs shock energy through the loads of the rider R and air bag module M and the slide resistance of the resistance imparting member 11. As a result, the shock imposed on the rider R is minimized by both a restraining action for the rider induced by the expansion of the air bag 16 and a shock absorbing action induced by the forward movement of the slide frame 10.

Figure 9:
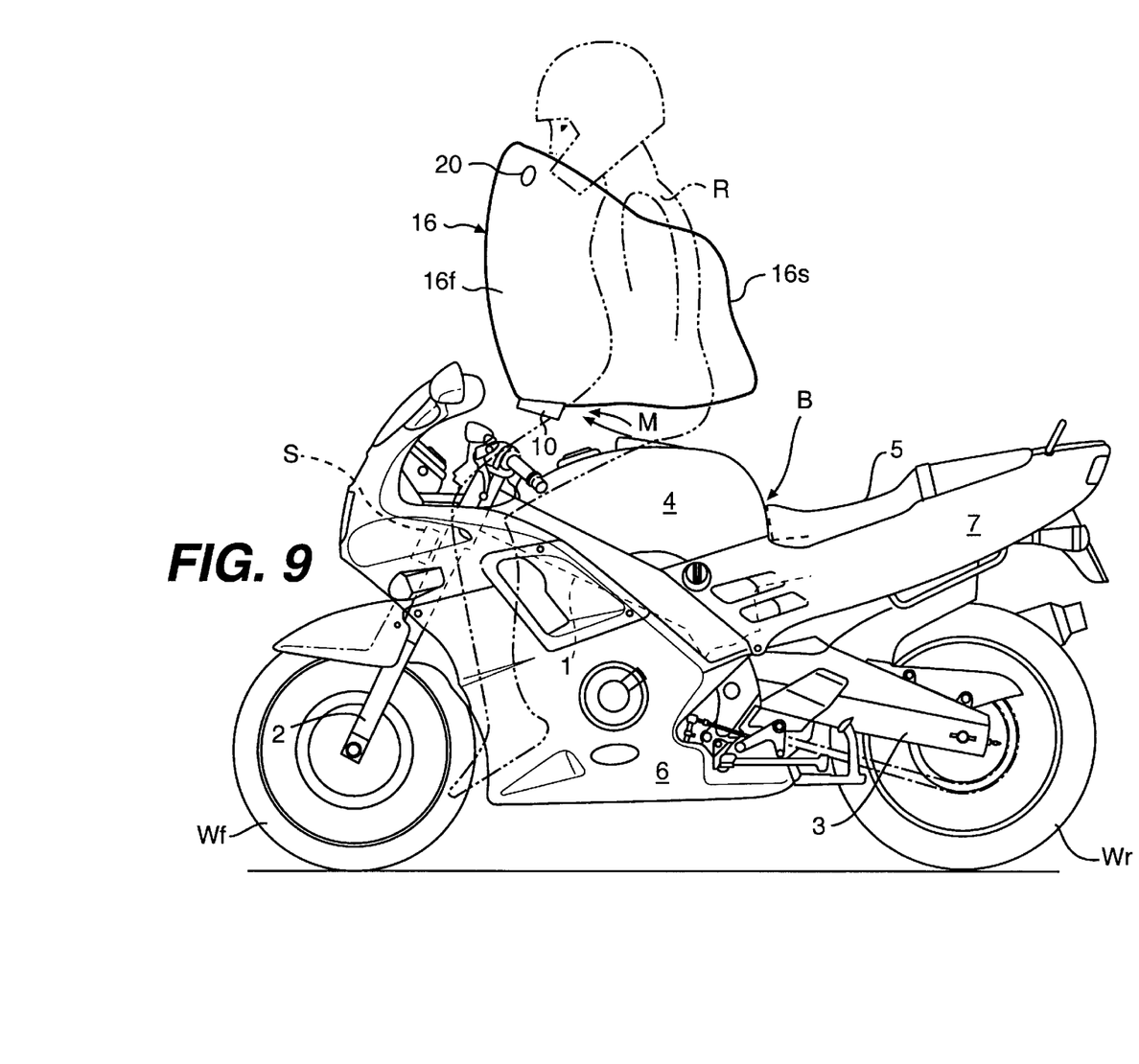
FIG. 9 is a side view of the two-wheeled motor vehicle, showing a state in which the air bag has shifted away from the vehicle.

When the shock resulting from a crash of the vehicle is very large, as shown in FIG. 9, the slide frame 10 moves away from the left and right guide rails $9l$,$9r$ and the rider R leaves the vehicle while being restrained by the air bag 16. In this case, the shock acting on the rider can be minimized by cooperation of both shock energy absorbing action induced by the forward slide of the slide frame 10 and restraining action of the air bag 16 for the rider R.

Although an embodiment of the present invention has been described above, the invention is not limited thereto, but various modifications may be made within the scope of the invention. For example, although in the above embodiment the air bag module is provided on the fuel tank, it may be mounted to any other vehicular body portion, for example the body frame. Further, although in the above embodiment the air bag is adhered to and held on the rider through the adhesive means, it may be adhered to and held on the rider by twining of only the air bag itself around the rider without using the adhesive means.

According to the present invention, as set forth hereinabove, since it is not required for the rider to put on the air bag device in advance, the rider does not feel resistance or uneasiness during normal vehicular running, nor is there any trouble with regard to putting on and taking off the air bag device or carrying or storing the same device.

After expansion of the air bag which is a principal portion of the air bag device, a front bag portion and right and left side bag portions are formed integrally and are adhered to and held on the rider in a twined state around the rider, and this state can be maintained. Accordingly, the rider can be restrained and cushioned against a crash of the vehicle and also against subsequent secondary and tertiary shocks. Thus, the rider cushioning performance can be greatly improved.

Further, according to the present invention, since the air bag module is movable with respect to the vehicle body in the event of the occurrence of a crash, the rider cushioning performance is further improved by a shock absorbing action induced by the movement of the air bag module in addition to the rider restraining and cushioning action of the air bag.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag device for a two-wheeled motor vehicle capable of restraining and cushioning a rider by expansion of an air bag provided on a body of the vehicle, comprising:
   a front bag portion disposed to be opposed to the front side of the rider upon expansion of the air bag;
   right and left side bag portions for extending integrally backwardly from both right and left sides of said front bag portion and which come to be opposed to both right and left sides of the rider upon expansion of the air bag; and
   said air bag twines around the body of the rider upon expansion thereof.

2. The air bag device for a two-wheeled motor vehicle according to claim 1, wherein free ends of said right and left side bag portions are rolled inside toward each other to restrain and cushion both sides of the back of the rider.

3. The air bag device for a two-wheeled motor vehicle according to claim 1, wherein the surface of said air bag which comes to be opposed to the rider is provided with an adhesive material for improving the adhesion to the rider's clothes.

4. The air bag device for a two-wheeled motor vehicle according to claim 1, wherein an air bag module provided with said air bag is movable forward with respect to the vehicle body upon occurrence of a crash accident.

5. The air bag device for a two-wheeled motor vehicle according to claim 1, wherein an air bag module provided with said air bag can be disengaged from the vehicle body after expansion of the air bag.

6. The air bag device for a two-wheeled motor vehicle according to claim 1, and further including a vent opening for relieving excess pressure within said air bag.

7. The air bag device for a two-wheeled motor vehicle according to claim 1, and further including an inflator operatively connected to said air bag and to a sensor secured to said vehicle for selectively inflating said air bag upon the detection of a crash by said sensor.

8. The air bag device for a two-wheeled motor vehicle according to claim 3, wherein the adhesive material is a pressure-sensitive adhesive.

9. The air bag device for a two-wheeled motor vehicle according to claim 4, and further including a sliding frame mounted on left and right guide rails for enabling movement of said air bag in a forward direction with respect to the vehicle body upon the occurrence of a crash.

10. The air bag device for a two-wheeled motor vehicle according to claim 9, and further including a resistance imparting material for restraining the movement of said sliding frame.

* * * * *